Sept. 29, 1925.
J. D. NIXON
VALVE FOR PUMPS
Filed May 31, 1924
1,555,068
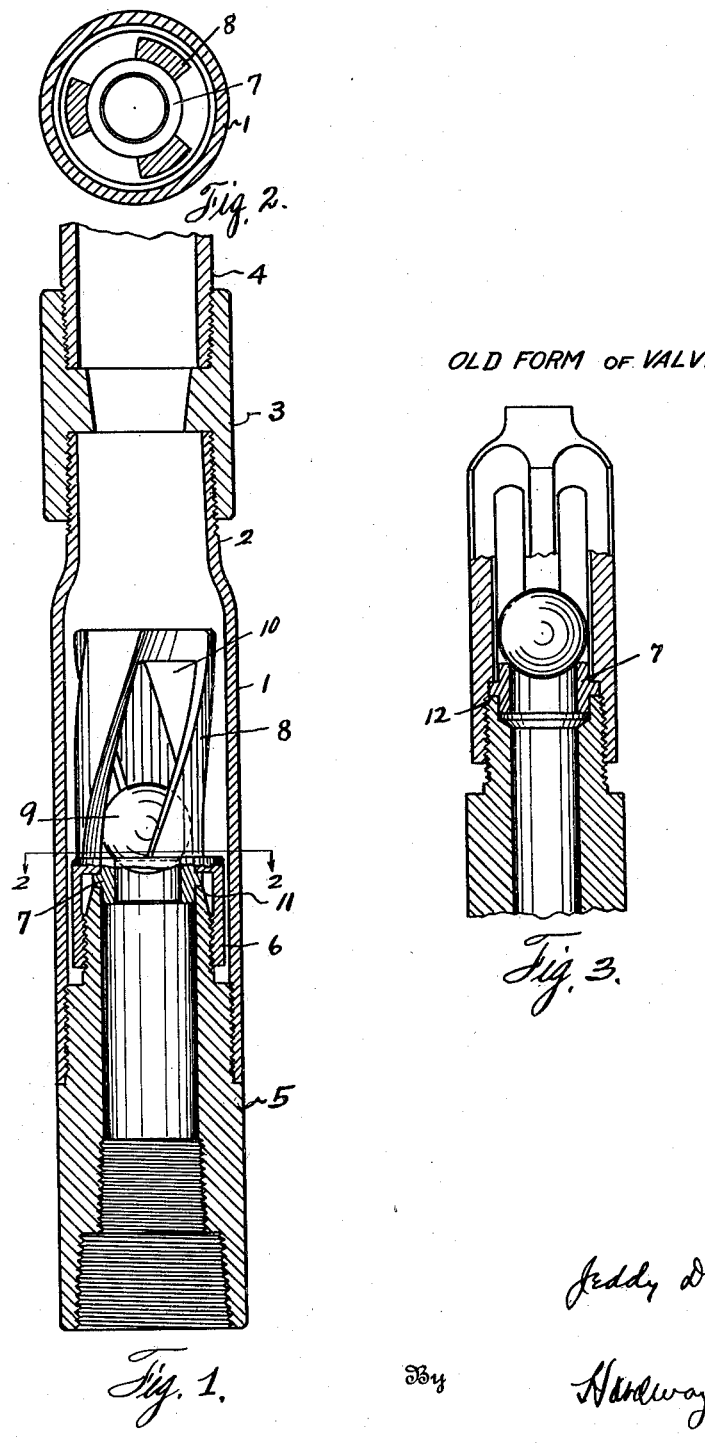

Patented Sept. 29, 1925.

1,555,068

UNITED STATES PATENT OFFICE.

JEDDY D. NIXON, OF HOUSTON, TEXAS.

VALVE FOR PUMPS.

Application filed May 31, 1924. Serial No. 717,031.

*To all whom it may concern:*

Be it known that I, JEDDY D. NIXON, a citizen of the United States, residing at Houston, in the county of Harris and State of Texas, have invented certain new and useful Improvements in Valves for Pumps, of which the following is a specification.

This invention relates to new and useful improvements in valves for pumps.

One object of the invention is to provide a valve of the character described, specially designed for use in deep well pumps, particularly such pumps as are commonly used for pumping oil from oil wells. A pump of this character, as now constructed, embodies a working barrel and a standing valve connected to the lower end of said barrel, by a special type of coupling, and having a seat therein forming part of said standing valve, and includes also a working or traveling valve in the barrel above the standing valve. It is common to use a type of standing valve, the cage of which projects up into the working barrel, and in order to use said type of valve the seat in said coupling must be bored or reamed out so as to give room for the cage to enter the working barrel. Said working barrel and its bottom coupling are standard and common to pumps of the character under consideration, but as at present constructed, whichever type of standing valve is employed, the fluid passageway through said standing valve is restricted, and much less than the diameter of the working barrel so that on account of said restriction the pump is not supplied with the volume it would otherwise be capable of handling. It is one of the prime objects of this invention to provide a pump standing valve which may be readily attached to the conventional working barrel coupling and conventional working barrel, without the necessity of making any change in said coupling or barrel, and which will have greater capacity for permitting the inflow of fluid into the working barrel, than is the case of standing valves now in common use.

Another object of the invention is to provide a valve structure which may be adapted for use either in a standing valve, or a traveling valve and which embodies a construction which, when assembled together, will prevent leakage through between the valve seat, on one side, and the valve body and cage on the other; and which will thereby prevent the valve seat from becoming worn away by fluid and grit being forced under pressure through the joint between said valve seat, and the surrounding valve cage and valve body.

Another object of the invention resides in the provision of a novel type of valve cage through which a spiralled motion is imparted to the fluid being pumped with the result that the valve is partly rotated with each fluid impulse, so that the surface wear on the valve will be uniform throughout its circumference.

With the above and other objects in view, this invention has particular relation to certain novel features of construction, operation and arrangement of parts, an example of which is given in this specification and illustrated in the accompanying drawings, wherein:—

Figure 1 shows a vertical sectional view of my improved form of valve as embodied in a pump standing valve.

Figure 2 shows a transverse sectional view taken on the line 2—2 of Figure 1; and, Figure 3 shows a vertical sectional view of an ordinary type of standing valve construction, which has been shown for the sake of comparison to more clearly illustrate the improvement of the construction shown in Figure 1.

Referring now more particularly to the drawings, wherein like numerals of reference designate similar parts in each of the figures, the numeral 1 designates the valve casing, which is of the general form of a tubular nipple, and whose upper end is reduced, and outwardly threaded, as at 2, to enter the coupling 3 by means of which the valve is connected to the working barrel 4 of the pump. The casing is shown bored out from beneath, so as to have a larger inside diameter than the inside diameter of the working barrel, the proportion being approximately two and one-half inches inside diameter of the casing, to one and three-fourths inches inside diameter of the working barrel.

The valve body is designated by the numeral 5 and is tubular in form. Its upper end is stepped and outwardly threaded, so as to screw up into the lower end of said casing, and to reecive the clamp nut 6 which holds the annular valve seat 7 in place.

Integral with the clamp, nut 6 and upstanding therefrom there is a valve cage 8 which confines the ball valve 9 in proper relation to the seat 7 which it controls. It is to be noted that the fluid passageways, as 10, through the cage 8, are spiralled and the fluid being pumped will consequently impart a rotary motion to the valve 9, with each impulse thereof.

This will cause the surface wear on the valve to be substantially uniform so that the valve will maintain a smooth surface, and consequently a close fit of the valve seat.

It is to be noted that the extreme upper end of the valve body 5 is inwardly tapered, as at 11, and smooth, and the clamp nut 6 maintains a threaded engagament therewith only near the base of said reduced portion. It is a well known fact that valve seats, such as 7, are not of uniform diameter and in many cases must be driven into the upper end of the valve body, causing said upper end to spread. It is also well known that valve bodies now in common use are uniform and threaded all the way up to their upper ends, as at 12 in Figure 3. In case the valve seat 7 must be driven home, and the upper end of the valve body is thereby spread, the clamp nut 6 of the cage cannot be screwed into place on the valve body, as now constructed, without mutilating the threads and thus providing a leaky joint which under fluid pressure will gradually enlarge and cause the pump to leak to such an extent that it will be worthless. It is obvious that with the construction shown in Figure 1, the upper end of the valve body may be spread considerably, in driving in a valve seat, without spreading the threaded portion of said body, and without interfering with the threading of the clamp nut 6, of the valve cage thereon.

What I claim is:—

1. A pump valve mechanism including a valve body having a fluid passageway therethrough, and whose upper end is reduced, a valve seat fitted within said body and formed with an annular rib which rests on the upper end of said body, a valve controlling said seat, a valve cage confining said valve and formed with a clamp nut which is threaded onto the reduced upper end of the valve body, and which is formed with an annular shoulder which abuts against said rib, the extreme upper end of said reduced portion being further reduced and spaced inwardly from said nut.

2. A valve mechanism including a tubular body whose upper end is tapered and blank on the outside, said upper end being threaded beneath said tapered portion, a valve seat fitted into said upper end, a valve controlling said seat, a valve cage formed with a clamp nut which is connected by said threads onto the upper end of said body and which clamps said seat in place, said clamp nut being spaced away from said tapered portion.

3. A valve mechanism including a tubular body, whose upper end is reduced and threaded, said upper end being further reduced and blank above said threads, a valve seat fitted into said upper end, a valve controlling said seat, a valve cage formed with a clamp nut which is threaded onto the upper end of said body and which clamps said seat in place, said cage being spaced away from said blank portion thus providing a space between them, said cage having spiralled fluid passageways therethrough.

4. A valve mechanism including a tubular body, a valve seat thereon, having a fluid passageway, a ball valve co-operating with the seat, a cage secured on the body confining the valve on the seat said cage having a fluid opening, disposed to deflect the fluid current laterally and thereby impart rotation to the valve, the extreme upper end of the body being reduced thus forming an annular space between said upper end and said cage.

In testimony whereof I have signed my name.

JEDDY D. NIXON.